(12) United States Patent
Rodrigues et al.

(10) Patent No.: US 6,213,242 B1
(45) Date of Patent: Apr. 10, 2001

(54) FOUR WHEEL DRIVE SYSTEM HAVING TORQUE DISTRIBUTION CONTROL RESPONSIVE TO THROTTLE POSITION, SPEED AND SELECTED RANGE

(76) Inventors: Ashok Rodrigues, 1242 Franciscan Ct. E., Canton, MI (US) 48187; John Glab, 15780 Cumberland, Riverview, MI (US) 48192

(*) Notice: Subject to any disclaimer, the term of this patent is extended or adjusted under 35 U.S.C. 154(b) by 0 days.

(21) Appl. No.: 09/144,164

(22) Filed: Aug. 31, 1998

(51) Int. Cl.$^7$ .................................................. B60K 17/344
(52) U.S. Cl. .............................. 180/249; 180/248; 701/89
(58) Field of Search .................................... 180/233, 244, 180/247, 248, 249, 250; 701/89

(56) References Cited

U.S. PATENT DOCUMENTS

| | | |
|---|---|---|
| 4,757,870 | 7/1988 | Torii et al. . |
| 5,010,974 | 4/1991 | Matsuda . |
| 5,032,995 | 7/1991 | Matsuda et al. . |
| 5,363,938 | * 11/1994 | Wilson et al. ........................ 180/233 |
| 5,407,024 | * 4/1995 | Watson et al. ....................... 180/248 |
| 5,662,543 | * 9/1997 | Forsyth ................................ 180/249 |
| 5,927,425 | * 7/1999 | Kusano ................................ 180/248 |

OTHER PUBLICATIONS

1998 Ford 2000 Explorer Mountaineer Wokshop Manual, vol. 1.

* cited by examiner

Primary Examiner—Anne Marie Boehler
(74) Attorney, Agent, or Firm—Ford Global Technologies, Inc.

(57) ABSTRACT

A four-wheel drive system for a motor vehicle includes a transfer case through which power is continually transmitted to a first drive wheel pair and a clutch that controls a magnitude of torque transmitted to a second drive wheel pair in accordance with an electric current duty cycle applied to the clutch by a control unit that produces an output duty cycle in response to a range selected by the operator, the vehicle speed, and the position of the throttle that controls a power source driveably connected to the input side of the transfer case.

2 Claims, 2 Drawing Sheets

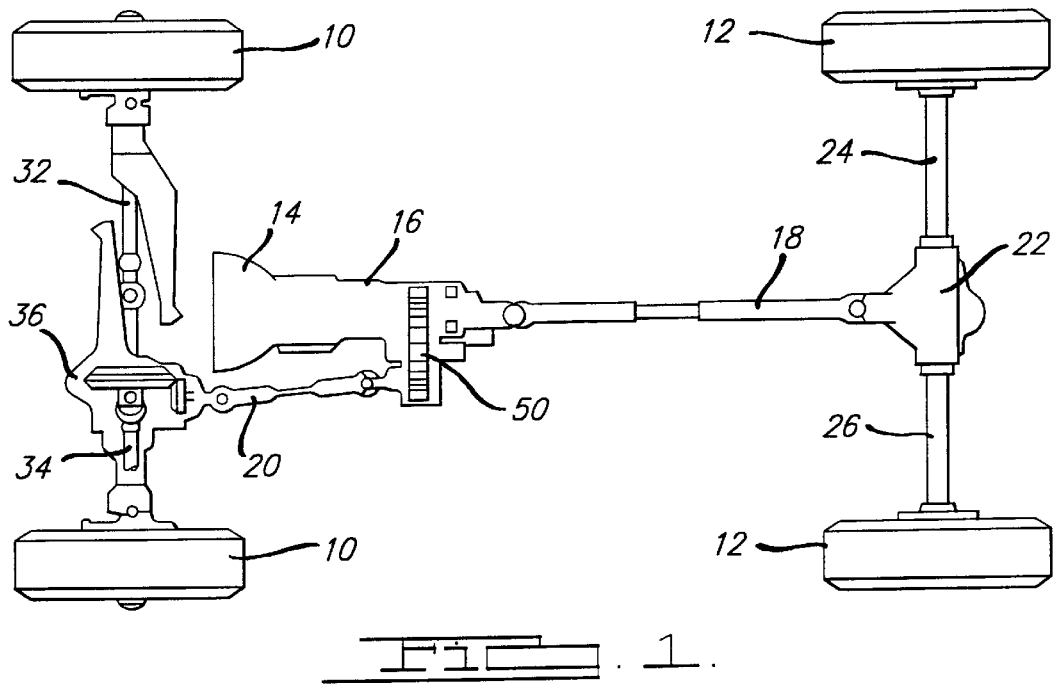
FIG. 1.
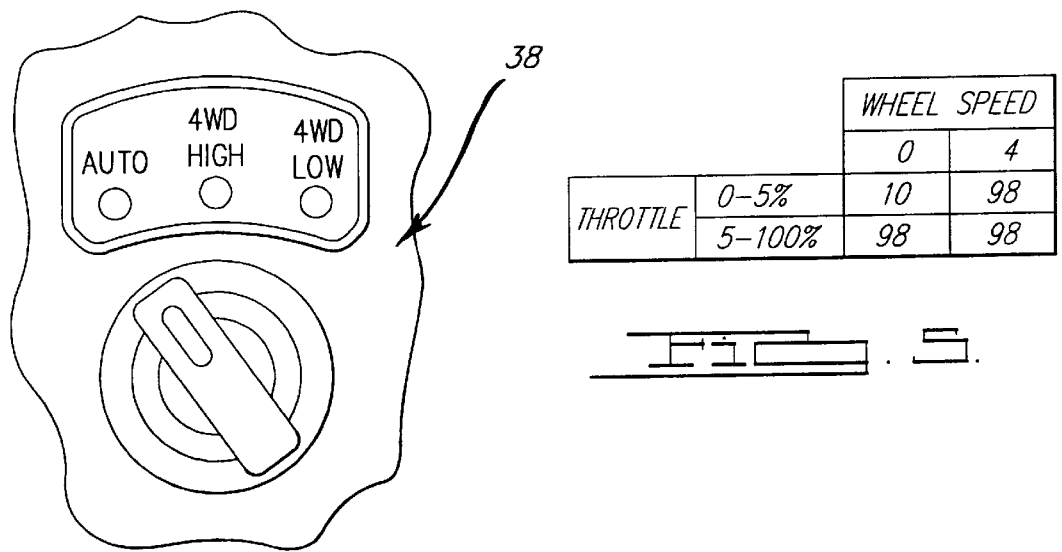
FIG. 2.
| | WHEEL SPEED | |
|---|---|---|
| | 0 | 4 |
| THROTTLE 0-5% | 10 | 98 |
| THROTTLE 5-100% | 98 | 98 |
FIG. 3.
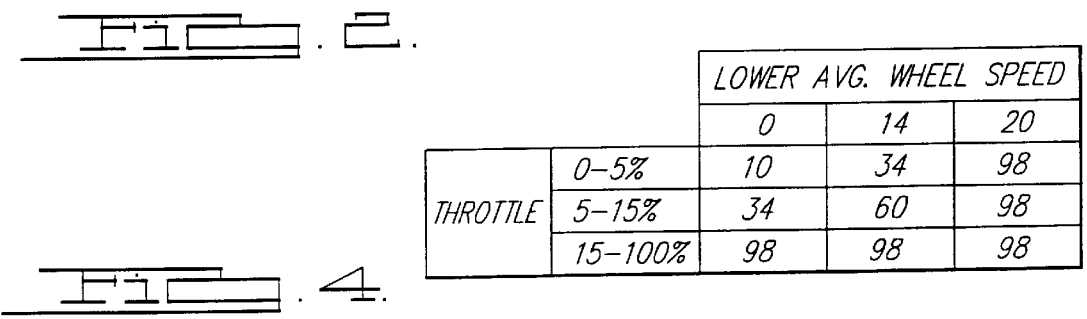
| | LOWER AVG. WHEEL SPEED | | |
|---|---|---|---|
| | 0 | 14 | 20 |
| THROTTLE 0-5% | 10 | 34 | 98 |
| THROTTLE 5-15% | 34 | 60 | 98 |
| THROTTLE 15-100% | 98 | 98 | 98 |
FIG. 4.

250
FOUR WHEEL DRIVE SYSTEM HAVING TORQUE DISTRIBUTION CONTROL RESPONSIVE TO THROTTLE POSITION, SPEED AND SELECTED RANGE

BACKGROUND OF THE INVENTION

1. Field of the Invention

This invention pertains to the field of four wheel drive systems for motor vehicles, particularly to control of a transfer case clutch that distributes torque to the front and rear axles.

2. Description of the Prior Art

In a four-wheel drive 4WD system engine torque is transmitted to a secondary pair of drive wheels in response to a control signal applied to a transfer clutch located in a transfer case. The control signal is produced when certain parameters, represented by signals produced by electronic sensors, indicate vehicle operating conditions can be improved by activating both the primary drive wheels and secondary drive wheels. U.S. Pat. No. 4,757,870 describes a transfer clutch controlled with reference to the rotational speed difference between the primary and secondary drive wheels. U.S. Pat. No. 5,010,974 describes a similar system for controlling a transfer clutch upon reference to the speed difference, vehicle speed, and engine intake manifold vacuum.

Conventionally a 4WD system includes a transfer case driveably connected to the output shaft of a multiple-speed transmission. The transfer case contains the transfer clutch, a speed-reduction gearset for increasing transmission output torque, a mechanism for engaging and disengaging the gearset and a torque path, such as a ball ramp drive, for transmitting power through the transfer case to the front driveshaft through the transfer clutch.

SUMMARY OF THE INVENTION

It is an advantage of this invention in a drivetrain that transmits forward and reverse drive to front and rear drive wheels to provide a four-wheel drive system that eliminates noise and harsh engagement in a transfer case when reversing the direction of rotation of the wheels while providing the full benefit of a locked transfer case.

It is an object of this invention to provide a four-wheel drive system that controls the torque capacity of a transfer clutch by applying a predetermined electric current duty cycle to the clutch, the duty cycle corresponding to the selected operating range of the transfer case, the engine throttle position and the lower average speed of the front and rear wheel pairs.

In realizing these objects and advantages a four wheel drive system according to the present invention for a vehicle having an engine controlled by a throttle, a first pair driving wheels, and second pair of driving wheels includes a range selector for producing a signal representing selected operation in a high speed ratio range and low speed ratio range; a transfer case for driveably connecting the power source and a first pair of wheels, and for driveably connecting the power source and a second pair of wheels through a transfer clutch whose torque capacity varies in response to a control signal applied to the clutch; means for producing a signal representing the lower speed of the average speed of the first pair of driving wheels and the average speed of the second pair of driving wheels; a sensor for producing a signal representing the position of said throttle or another measure of inferred engine torque; and control means connected to the range selector, determining means and engine torque indicating means for producing a control signal corresponding to the signals representing said selected range, engine torque and said lower average speed, and for applying said control signal to said transfer clutch.

BRIEF DESCRIPTION OF THE DRAWINGS

FIG. 1 is a schematic plan view of four-wheel drive systems according to this invention.

FIG. 2 shows a rotary control switch on the instrument panel used to choose manually among three different 4×4 operating ranges.

FIG. 4 represents a lookup table containing transfer clutch duty cycle values applicable when the 4WD High range is selected.

FIG. 5 represents a lookup table containing transfer clutch duty cycle values applicable when the 4WD Low range is selected.

DESCRIPTION OF THE PREFERRED EMBODIMENT

Figure 3:
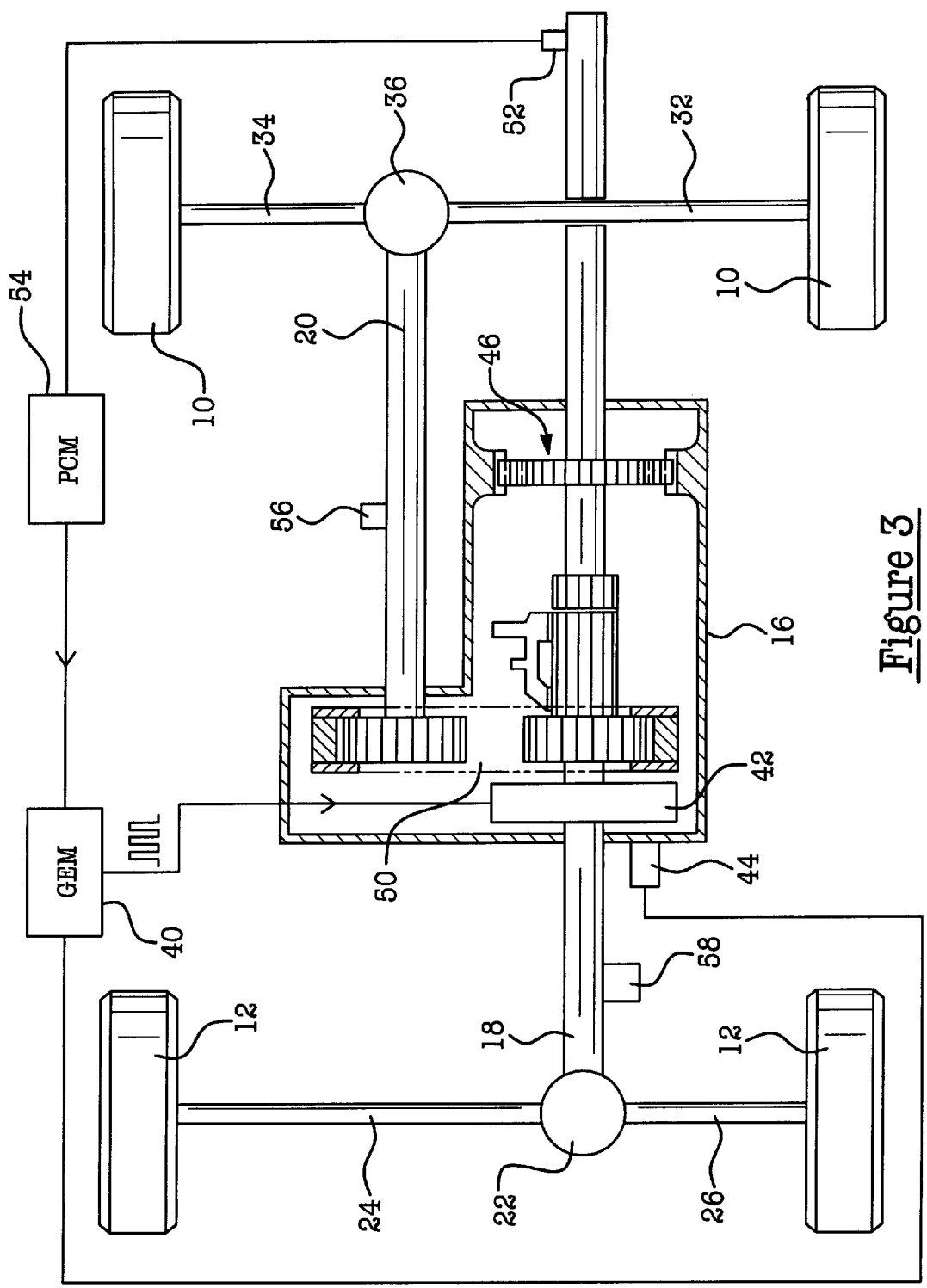
FIG. 3 is a schematic diagram of the system for controlling operation of the system of FIG. 1.

Referring first to FIG. 1, the powertrain of a motor vehicle, to which the present invention can be applied, includes front and rear wheels 10, 12, an automatic or manual transmission for producing multiple forward and reverse speed ratios driven by an engine (not shown), and a transfer case 16 for continuously driveably connecting the transmission output to a rear drive shaft 18 and for selectively connecting the transmission output to a front drive shaft 20 when four wheel drive is electronically activated. Shaft 18 transmits power to rear wheel differential 22, from which power is transmitted to the rear wheels 12 through axle shafts 24, 26, which are contained within a differential housing. The front wheels are driveably connected under certain conditions to right-hand and left-hand axle shafts 32, 34, to which power is transmitted from the front driveshaft 20 through a front differential 36.

FIG. 2 shows a rotary control switch 38 for transfer case operation located on the instrument panel that allows the operator to choose manually among: Automatic mode, a 4WD High range and 4WD Low range. The operator can select the Automatic mode and 4WD High range at any vehicle speed, and the 4WD Low range provided vehicle speed is less than about 5 km/h.

In the Automatic mode, while the vehicle is stopped or at highway speed, a generic electronic module 40 (GEM) applies a minimum duty cycle to a transfer clutch 42, thereby transmitting a low magnitude of engine torque to the front drive shaft through the clutch. This action allows a slight speed difference between the front and rear drive shafts, which occurs normally when negotiating a turn on dry pavement. The GEM increases the torque sent through the transfer clutch to the front wheels in order to prevent or control slip whenever: slip is calculated from an output signals produced by shaft speed sensors adjacent the front and rear driveshafts; or the vehicle is being accelerated at high magnitude; or during very light or zero throttle conditions positions at moderate vehicle speed.

In a conventional transfer case operating in a 4WD Low range, an electromagnetic transfer clutch 42 locks the front and rear drive shafts for maximum 4WD traction. In a transfer case suited for use with this invention, a motor 44 rotates a shift cam to move a reduction fork to the 4WD Low range position. This range shift to the Low range is accomplished through a planetary gearset 46 that changes the torque ratio to the drive shaft from 1:1 to 2.48:1.

In a conventional transfer case operating also in a 4WD High range, clutch 42 locks the front and rear drive shafts for maximum 4WD traction. In a transfer case suited for use with this invention, the GEM 40 locks the front and rear drive shafts 18, 20 for maximum 4WD traction. Operation in the 4WD High range is intended for off-road or severe winter weather use only, but not for use on dry or merely wet pavement.

The transfer case contains a planetary speed reduction gearset 46, which is operative in the 4WD Low range to increase transmission output torque and is bypassed when the 4WD High range is selected. A range change from 4WD High to 4WD Low is accomplished when a reduction shift fork moves a reduction collar to lock the speed reduction gearset 46 to an output shaft. Torque from the transmission output shaft is then transmitted through a sun gear of the gearset, which produces a speed reduction in the transfer case. Power is transmitted through an electromechanical transfer clutch assembly 42 which drives a sprocket wheel when the GEM 40 activates the coil of the transfer clutch. The drive sprocket wheel turns a chain 50, which drives an output sprocket wheel connected to the front drive shaft 20.

The transfer case shift motor 44, mounted externally at the rear of the transfer case, drives a rotary cam, which moves a range fork in the transfer case to shift between high range (for Automatic and 4WD High) and 4WD Low range positions for desired vehicle operation.

A throttle position sensor 52 produces an output signal to the GEM 40 through a powertrain control module PCM 54. This signal is used by the GEM in combination with other signals to control the torque capacity of the transfer clutch 42. An alternative signal indicating inferred engine torque can be produced by a mass air flow sensor or an engine manifold vacuum sensor.

Front and rear driveshaft speed sensors 56, 58 produce signals representing the speed of the front and rear driveshafts 18, 20. The signals produced by the speed sensors are used as input to the GEM 40 primarily to control the torque capacity of the transfer clutch 42. The control includes a comparator device to determine the magnitude of the lower average speed of the front wheel pair 10 and rear wheel pair 12. In a vehicle in which the rear wheels are continually driven through the transfer case from the transmission output and the front wheels are driven in the 4WD range through a driveshaft, this lower speed magnitude is determined by comparing the speeds represented by the output signals of sensors 56 and 58. However, in another form of a drivetrain to which this invention may be applied, e.g., a vehicle whose front wheels are continually driven directly from the transmission output and whose rear wheels are driven only in the 4WD range, the average speed of the front wheels may be determined and the average speed of the rear wheels may be determined. Thereafter, the average speeds are compared to determine the lower average speed of the wheel pairs.

The GEM 40 varies the magnitude of torque transmitted to the front drive shaft 20 by controlling the slip across the transfer clutch 42, i.e., the degree to which the transfer case clutch is fully engaged. Transfer clutch slip varies in accordance with the magnitude of the applied duty cycle.

When the vehicle operator selects the 4WD High or 4WD Low range by moving the position of switch 38, the control determines the selected operating range. The control also determines the current throttle position from the throttle position sensor 52, and the lower average speed of the wheel pairs, as explained above. This information is used to index the corresponding duty cycle value from the lookup tables of FIGS. 4 and 5. The GEM 40 produces and applies the corresponding duty cycle to transfer clutch 42.

As FIG. 4 shows, when the lower average wheel speed is low and substantially zero, the applied duty cycle increases as the engine throttle opens. Above a predetermined lower average wheel speed, the duty cycle is high, thereby increasing the torque capacity of the transfer clutch to its maximum and transmitting maximum torque to the wheels that are driven only in four wheel drive. A similar trend occurs in FIG. 5 with respect to the 4WD Low range, except that the maximum duty cycle occurs at a lower average wheel speed, due to the speed reduction and torque multiplication that occurs when the Low range is selected.

The ball-ramp mechanism may produce noise when the transmission changes the rotational direction of its output shaft, such as when shifting between forward drive and reverse drive, due to load release while the transfer clutch is transmitting torque.

Preferably, noise due to this condition can be avoided by ensuing that transfer clutch torque is low whenever operating parameters of the drivetrain indicate that a directional reversal might occur or is likely to occur. Therefore, when wheel speed and the engine torque are low, the duty cycle applied to the transfer clutch and its corresponding torque capacity are low. As engine torque increases, the duty cycle and transfer clutch torque capacity increase. Similarly, duty cycle and clutch torque capacity increase for a constant throttle position as wheel speed increases. These techniques do not restrict the expectations of the vehicle operator for a fully locked transfer case.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed is:

1. A four wheel drive system invention for a vehicle having a power source controlled by a throttle, a first pair and second pair of driving wheels, comprising:

a range selector for producing a signal representing selected operation in a four wheel drive high mode and four wheel drive low mode;

a transfer case for driveably connecting the power source and a first pair of wheels, and for driveably connecting the power source and a second pair of wheels through a transfer clutch whose torque capacity varies in response to a control signal applied to the clutch;

determining means for producing a signal representing the lower speed of the average speed of the first pair of driving wheels and the average speed of the second pair of driving wheels;

a sensor for producing a signal representing the position of said throttle; and control means connected to the range selector, determining means and sensor, for producing a control signal corresponding to the signals representing said selected mode, throttle position and said lower average speed, and for applying said control signal to said transfer clutch, said control means being further effective to cause said control signal to have a value which is effective to cause the torque capacity of said transfer clutch to remain substantially high when said range selector is in said four wheel drive high and low mode, and to cause the torque capacity of said clutch to become substantially low when said range selector is in said four wheel drive high and low mode only when said lower average speed and said throttle position are relatively low, thereby substantially preventing noise and harsh engagement within said four wheel drive system.

2. A four wheel drive system invention for a vehicle having a power source controlled by a throttle, a first pair and second pair of driving wheels, comprising:

a range selector for producing a signal representing selected operation in a four wheel drive high mode and four wheel drive low mode;

a transfer case for driveably connecting the power source and a first pair of wheels, and for driveably connecting the power source and a second pair of wheels through a transfer clutch whose torque capacity varies in response to a control signal applied to the clutch;

determining means for producing a signal representing the lower speed of the average speed of the first pair of driving wheels and the average speed of the second pair of driving wheels;

indicating means for indicating inferred engine torque; and control means connected to the range selector, determining means and indicating means, for producing a control signal corresponding to the signals representing said selected mode, inferred engine torque and said lower average speed, and for applying said control signal to said transfer clutch, said control means being further effective to cause said control signal to have a value which is effective to cause the torque capacity of said transfer clutch to remain substantially high when said range selector is operating in four wheel drive high and low mode, and to cause the torque capacity of said clutch to become substantially low when said range selector is in said four wheel drive high and low mode only when said lower average speed and said inferred engine torque are relatively low, thereby substantially preventing noise and harsh engagement within said four wheel drive system.

\* \* \* \* \*